Nov. 26, 1963 D. J. CAMPBELL 3,112,455
MULTI-STAGE AMPLIFIER WITH FEEDBACK
Filed Aug. 17, 1959
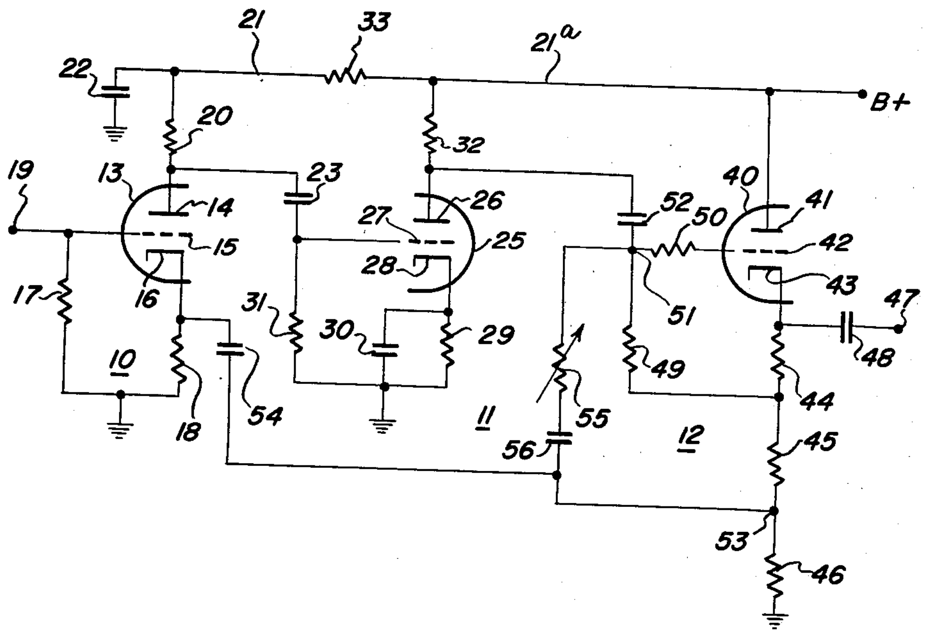
INVENTOR.
DONALD J. CAMPBELL
BY William H. Brenner
Agent
Hurvitz & Rose
ATTORNEYS United States Patent Office 3,112,455

Patented Nov. 26, 1963

3,112,455
MULTI-STAGE AMPLIFIER WITH FEEDBACK

Donald J. Campbell, Cincinnati, Ohio, assignor to The Baldwin Piano Company, Cincinnati, Ohio, a corporation of Ohio Filed Aug. 17, 1959, Ser. No. 834,165
3 Claims. (Cl. 330—88)

The present invention relates generally to amplifiers, and more particularly to a multi-stage voltage amplifier providing negative feed-back between its output stage and its input stage, without increasing hum, and utilizing a common capacitance to provide both an overall feed-back path from output to input of the amplifier and a by-pass for a first stage bias resistance.

Briefly describing a preferred embodiment of the invention as applied in a multi-stage amplifier, three amplifier stages are connected in cascade, the first two stages being anode loaded and the last stage being cathode loaded. The first stage includes a cathode resistance, for developing bias voltage. A large capacitor is connected between a point of the cathode load and the cathode of the first stage tube, and the point of connection to the cathode load is selected to have a very small impedance to ground. Thereby, the latter impedance is in series with the large coupling capacitor, as seen by the bias circuit, and in common with the capacitor, provides an effective by-pass path for the bias resistance, which is connected between the cathode of the first stage tube and ground. A portion of the output voltage of the amplifier is developed across the small impedance, and is fed back to the first stage cathode through the large capacitor. The source of feed-back voltage sees the capacitor and the bias resistance as a series load. The capacitor thus performs a double function, i.e., it performs as a feed-back capacitor from third to first stage and as a by-pass capacitor for the bias resistance of the first stage.

It is, accordingly, a broad object of the present invention to provide a novel amplifier employing negative feed-back.

It is another object of the present invention to provide a multi-stage voltage amplifier employing a cathode coupled output stage and a bias resistance in the initial stage of the amplifier, wherein a capacitor is commonly employed to provide not only by-pass capacitance for the bias resistance but also a feed-back path between the output stage and the initial stage of the amplifier.

The above and still further objects, features and advantages of the present invention will become apparent upon consideration of the following detailed description of one specific embodiment thereof, especially when taken in conjunction with the accompanying drawings, wherein:

The single FIGURE of the drawings is a schematic circuit diagram of a preferred embodiment of the invention.

Referring now more specifically to the accompanying drawings, the reference numerals 10, 11 and 12 denote, respectively, three stages of a voltage amplifier connected in cascade.

The first stage, 10, includes a triode vacuum tube 13, having an anode 14, a control grid 15 and a cathode 16. A grid leak resistance 17 is connected between control grid 15 and a point of reference potential, as ground. A cathode bias resistance 18 (1K) is connected between cathode 16 and ground. A signal input terminal 19 is directly connected to grid 15, and an anode load resistance 20 is provided between anode 14 and B+ bus 21. The latter is decoupled from a second stage and is filtered for ripple frequency deriving from a B+ power supply (not shown) by a resistor 33 and a large condenser 22, connected between the bus 21 and ground. A coupling capacitor 23 is connected between anode 14 and the second stage 11.

The second stage 11 of the amplifier of the invention includes a triode vacuum tube 25 having an anode 26, a control grid 27 and a cathode 28. Bias voltage is provided by a parallel combination of resistance 29 and capacitance 30, connected between the cathode 28 and ground. A grid leak resistance 31 is provided between control grid 27 and ground, the coupling condenser 23 being coupled directly to the control grid 27. An anode load resistance 32 is provided, which is connected between the B+ bus 21*a* and the anode 26.

The third stage, 12, of the amplifier includes a triode vacuum tube 40 having an anode 41, a control grid 42 and a cathode 43. The anode 41 is directly connected to the bus 21*a*, so that the same supply voltage is provided for stages 11 and 12. In the cathode circuit of the triode 40 and connected between cathode 43 and ground are three resistances in series, identified by the reference numerals 44, 45 and 46. Appropriate values for the resistances, taken in the order named are 390 ohms, 4.7K and 3.3 ohms. The resistances 44, 45 and 46 taken in series constitute a cathode load for the triode vacuum tube 40, and an output terminal 47 may accordingly be coupled to the cathode 43 via a suitable coupling condenser 48.

Grid leak resistance is connected between the control grid 42 and the junction point of resistances 44, 45. The resistance 49, instead of being connected directly to the control grid 42, as is usual, is connected thereto via an oscillation-suppressing resistance 50 which may have a value of approximately 10K, whereas the resistance 49 may have a value of approximately 100K. Accordingly, as seen from the control grid 42, the resistances 49 and 50 taken in series constitute a grid leak; the junction of these resistances is utilized, however, to provide an input terminal 51 for the stage 12, to which is connected a coupling capacitor 52, extending from the anode 26 of the triode 25. Connection of the resistance 49 to the junction of the resistances 44 and 45 provides bias from the cathode circuit of the triode 40 to its control grid, the bias voltage being developed across the resistance 44.

Connected between the junction point 53 of resistances 45, 46 and the cathode 16 of the triode 13 of stage 10, is a capacitor 54 of about 40 mfd. capacitance. As seen from the cathode bias resistance 18, the capacitor 54 is connected thereacross, when taken in series with the resistance 46. Since the resistance 46 has a very small value, of the order of 3.3 ohms, the capacitor 54 is essentially the only impedance in shunt with the resistance 18, and has a sufficiently large value at audio frequencies, i.e., between approximately 40 c.p.s. and 10 kc., to act as a by-pass and assure that the voltage across the resistance 18 will be a steady D.C. voltage which will be suitable as bias for the control grid 15. As seen from feed-back resistance 46, however, the voltage developed across the resistance 46 is applied to the cathode 16 through the capacitor 54, and capacitor 54 thus acts as a coupling capacitor for all audio frequencies, developing a voltage across the resistance 18 which is substantially equal to the voltage developed across the resistance 46, and which is so phased as to provide negative overall feedback from the output stage 12 to the input stage 10. Thus, the maximum impedance of capacitors 54, at the lowest end of the audio band, is approximately 80 ohms, or less than 10% of the impedance of resistance 18, while the impedance ratio of resistor 46 to resistor 18 is less than 1%.

An expression device may be connected between the junction point 51 and the junction point 53, the expression device being conventionally a variable resistance 55 in series with a fixed capacitor 56, the combination of which effectively modifies the frequency response and the amplitude of the output stage 11 supplied to the stage 12 and accordingly the output amplitude of the amplifier taken over all. The position selected for connection of the expression device may be modified, in accordance with principles well known in the art, and more particularly, the expression device may be connected between the junction of resistance 50, 49, and ground, so as to modify the load resistance of the tube 25 as a means of varying the overall gain of the amplifier.

Preferred circuit values are as follows—

| Capacitors: | μf. |
|---|---|
| 22 | 20 |
| 23 | .02 |
| 30 | 40 |
| 48 | .47 |
| 52 | .22 |
| 54 | 50 |
| 56 | 1 |

| Tube types: | |
|---|---|
| 13 | 1/2 12AX7 |
| 25 | 1/2 12AX7 |
| 40 | 1/2 6SN7 |

| Resistances: | Ohms |
|---|---|
| 17 | 6.8K |
| 18 | 1K |
| 20 | 100K |
| 29 | 1K |
| 31 | 1M |
| 32 | 100K |
| 33 | 150K |
| 44 | 390 |
| 49 | 100K |
| 50 | 10K |
| 45 | 4.7K |
| 46 | 3.3 |

B+ terminal voltage: 250 v.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A multi-stage amplifier for a band of audio signals including at least three cascaded stages, the first of said stages including an amplifying device having an input electrode, an output electrode, and a common electrode, a relatively large self-bias resistor connected between a reference point and said common electrode, the third of said stages including a load impedance having relatively small resistance in comparison with said self-bias resistor, and a negative feedback channel extending from said relatively small load impedance to said relatively large self-bias resistance for coupling the audio signal across said load impedance to the common electrode of said first stage, said feedback channel including a series capacitor having an impedance sufficiently small to provide audio signal by-pass for said self-bias resistance through said relatively small load impedance, the capacity of said capacitor being such that, to said load resistance, the audio signal voltage developed across said load resistance is coupled through said capacitor to said common electrode, the impedance ratio of said load impedance to self-bias resistor being less than 0.1 and the impedance ratio of said capacitor at the lowest frequency in said band to said self-bias resistor being less than 0.010.

2. A multi-stage amplifier for a band of audio signals including a plurality of cascaded stages, the first of said stages including an amplifying device having an input electrode, an output electrode and a common electrode, a relatively large self-bias resistor connected between a reference point and said common electrode, the last of said stages including another amplifying device having a second input electrode and a second common electrode and a load impedance having relatively small resistance in comparison with said self-bias resistor, said small resistance being connected in series circuit between said another common electrode and said reference point, and a negative feedback channel extending from said relatively small load impedance to said relatively large self-bias resistance for coupling the audio signal across said load impedance to the common electrode of said first stage, said feedback channel including a series capacitor having an impedance sufficiently small to provide audio signal by-pass for said self-bias resistance through said relatively small load impedance, the capacity of said capacitor being such that, to said load resistance, the audio signal voltage developed across said load resistance is coupled through said capacitor to said common electrode, the impedance ratio of said load impedance to said resistor being less than 0.1 and the impedance ratio of said capacitor at the lowest frequency in said band to said resistor being less than 0.010.

3. The amplifier of claim 2 wherein said load impedance is another resistor of approximately 3.3 ohms, said self-bias resistor having a value of approximately 1,000 ohms, and said capacitor having a value of approximately 50 microfarads.

References Cited in the file of this patent

UNITED STATES PATENTS

| | | |
|---|---|---|
| 2,265,291 | Knick | Dec. 9, 1941 |
| 2,273,096 | Foster | Feb. 17, 1942 |
| 2,743,325 | Kaiser et al. | Apr. 24, 1956 |
| 2,831,975 | Catherall | Apr. 22, 1958 |
| 2,892,044 | Fairstein | June 23, 1959 |

FOREIGN PATENTS

| | | |
|---|---|---|
| 716,543 | Great Britain | Oct. 6, 1954 |